(12) United States Patent
Guter

(10) Patent No.: US 10,052,698 B2
(45) Date of Patent: Aug. 21, 2018

(54) MODULAR CARRIER TOOL AND TOOL HEAD

(71) Applicant: Kennametal Inc., Latrobe, PA (US)

(72) Inventor: Tim Guter, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 45 days.

(21) Appl. No.: 14/513,590

(22) Filed: Oct. 14, 2014

(65) Prior Publication Data

US 2015/0104266 A1 Apr. 16, 2015

(30) Foreign Application Priority Data

Oct. 15, 2013 (DE) ........................ 10 2013 220 884

(51) Int. Cl.
B23B 51/02 (2006.01)

(52) U.S. Cl.
CPC .......... *B23B 51/02* (2013.01); *B23B 2251/02* (2013.01); *Y10T 408/9097* (2015.01); *Y10T 408/9098* (2015.01); *Y10T 408/90987* (2015.01)

(58) Field of Classification Search
CPC ........... Y10T 408/907; Y10T 408/9097; Y10T 408/9098; Y10T 408/90987
See application file for complete search history.

(56) References Cited

U.S. PATENT DOCUMENTS 22,394 A 12/1858 White
40,297 A 10/1863 Wakefield
(Continued)

FOREIGN PATENT DOCUMENTS

AT 9431 B 10/1902
CN 1160370 A 9/1997
(Continued)

OTHER PUBLICATIONS

Mar. 10, 2017 Office action (3 months) 1.
(Continued)

*Primary Examiner* — Daniel Howell
*Assistant Examiner* — Yasir Diab
(74) *Attorney, Agent, or Firm* — Ian K. Samways

(57) ABSTRACT

The modular carrier tool (2), in particular drilling tool, extends along a central longitudinal axis (4) in axial direction (6) and comprises a carrier (8) as well as a tool head (10) that can be reversibly mounted on the front-end of the carrier (8). The carrier (8) has a head retainer (14) for the insertion of the tool head (10) as well as clamping webs (24), which radially delimit the head retainer (14) and also have bearing surfaces (28). The tool head (10) comprises clamping surfaces (35) extending in axial direction as well as underhead bearing surfaces (34). In a mounted state the clamping webs (24) clamp the tool head (10) in radial direction to the clamping surfaces (35) and the underhead bearing surfaces (34) are pressed against the bearing surfaces (28). In order to generate a force component (K) acting in radial direction unto the clamping webs (24), the bearing surfaces (28) as well as the underhead bearing surfaces (34) are tilted in radial direction towards the central longitudinal axis (4) by a tilt angle α. This particularly supports the radially exerted clamping force of the elastic clamping webs (24).

15 Claims, 3 Drawing Sheets

(56) References Cited

U.S. PATENT DOCUMENTS

| | | | |
|---|---|---|---|
| 44,915 A | 11/1864 | Baker | |
| 273,388 A | 3/1883 | Peatt | |
| 273,391 A | 3/1883 | Thrasher | |
| 329,660 A | 11/1885 | Lord | |
| 658,216 A | 9/1900 | Munger | |
| 690,093 A | 12/1901 | Beach | |
| 756,339 A * | 4/1904 | Down | 175/394 |
| 932,071 A | 8/1909 | Urbscheit | |
| 1,461,548 A | 7/1923 | West | |
| 2,158,120 A | 5/1939 | Hirschberg | |
| 2,289,583 A | 7/1942 | Malone | |
| 2,294,969 A | 9/1942 | Engvall | |
| 3,140,749 A | 7/1964 | Dionisotti | |
| 3,153,356 A | 10/1964 | Dearborn | |
| 3,293,727 A | 12/1966 | Simms | |
| 3,359,837 A | 12/1967 | Andreasson | |
| 3,410,749 A | 11/1968 | Chmiel | |
| 3,434,553 A | 3/1969 | Weller | |
| 3,548,688 A | 12/1970 | Kuch | |
| 3,765,496 A | 10/1973 | Flores | |
| 4,293,253 A | 10/1981 | Ott | |
| D262,219 S | 12/1981 | Lassiter | |
| D263,598 S | 3/1982 | Lassiter | |
| D273,387 S | 4/1984 | Lassiter | |
| D273,388 S | 4/1984 | Lassiter | |
| D273,389 S | 4/1984 | Lassiter | |
| D273,390 S | 4/1984 | Lassiter | |
| D273,391 S | 4/1984 | Lassiter | |
| 4,561,812 A | 12/1985 | Linden | |
| 4,744,704 A | 5/1988 | Galvefors | |
| 4,844,643 A | 7/1989 | Icks | |
| 5,024,563 A | 6/1991 | Randall | |
| 5,114,286 A | 5/1992 | Calkins | |
| 5,154,549 A | 10/1992 | Isobe | |
| 5,154,550 A | 10/1992 | Isobe | |
| 5,228,812 A | 7/1993 | Noguchi | |
| 5,346,335 A | 9/1994 | Harpaz | |
| 5,429,199 A | 7/1995 | Sheirer | |
| 5,452,971 A | 9/1995 | Nevills | |
| 5,509,761 A | 4/1996 | Grossman | |
| 5,634,747 A | 6/1997 | Tukala | |
| 5,649,794 A | 7/1997 | Kress | |
| 5,685,671 A | 11/1997 | Packer | |
| 5,769,577 A | 6/1998 | Boddy | |
| 5,791,838 A | 8/1998 | Hamilton | |
| 5,863,162 A | 1/1999 | Karlsson | |
| 5,904,455 A | 5/1999 | Krenzer | |
| 5,957,631 A | 9/1999 | Hecht | |
| 5,971,673 A | 10/1999 | Berglund | |
| 5,980,166 A | 11/1999 | Ogura | |
| 5,988,953 A | 11/1999 | Berglund | |
| 5,996,714 A | 12/1999 | Massa | |
| 6,000,000 A | 12/1999 | Hawkins | |
| 6,012,881 A | 1/2000 | Scheer | |
| 6,045,301 A | 4/2000 | Kammermeier | |
| 6,059,492 A | 5/2000 | Hecht | |
| 6,071,045 A | 6/2000 | Janness | |
| 6,109,841 A | 8/2000 | Johne | |
| 6,123,488 A | 9/2000 | Kasperik | |
| 6,276,879 B1 | 8/2001 | Hecht | |
| 6,447,218 B1 | 9/2002 | Lagerberg | |
| 6,481,938 B2 | 11/2002 | Widin | |
| 6,485,235 B1 | 11/2002 | Mast | |
| 6,506,003 B1 | 1/2003 | Erickson | |
| 6,514,019 B1 | 2/2003 | Schulz | |
| 6,524,034 B2 | 2/2003 | Eng | |
| 6,530,728 B2 | 3/2003 | Eriksson | |
| 6,582,164 B1 | 6/2003 | McCormick | |
| 6,595,305 B1 | 7/2003 | Dunn | |
| 6,595,727 B2 | 7/2003 | Arvidsson | |
| 6,626,614 B2 | 9/2003 | Nakamura | |
| 6,648,561 B2 | 11/2003 | Kraemer | |
| 6,840,717 B2 | 1/2005 | Eriksson | |
| 7,008,150 B2 | 3/2006 | Krenzer | |
| 7,048,480 B2 | 5/2006 | Borschert | |
| 7,070,367 B2 * | 7/2006 | Krenzer | B23B 51/02 408/226 |
| 7,114,892 B2 | 10/2006 | Hansson | |
| 7,125,207 B2 | 10/2006 | Craig | |
| 7,134,816 B2 | 11/2006 | Brink | |
| 7,189,437 B2 | 3/2007 | Kidd | |
| 7,237,985 B2 | 7/2007 | Leuze | |
| 7,306,410 B2 | 12/2007 | Borschert | |
| 7,309,196 B2 | 12/2007 | de Souza | |
| 7,311,480 B2 | 12/2007 | Heule | |
| 7,360,974 B2 | 4/2008 | Borschert | |
| 7,377,730 B2 | 5/2008 | Hecht | |
| 7,407,350 B2 | 8/2008 | Hecht | |
| 7,431,543 B2 | 10/2008 | Buettiker | |
| 7,467,915 B2 | 12/2008 | de Souza | |
| 7,559,382 B2 | 7/2009 | Koch | |
| 7,591,617 B2 | 9/2009 | Borschert | |
| D607,024 S | 12/2009 | Dost | |
| 7,625,161 B1 * | 12/2009 | Ruy Frota de Souza | B23B 51/02 407/113 |
| 7,677,842 B2 | 3/2010 | Park | |
| 7,740,472 B2 | 6/2010 | Delamarche | |
| 7,775,751 B2 | 8/2010 | Hecht | |
| 7,832,967 B2 | 11/2010 | Borschert | |
| 7,972,094 B2 | 7/2011 | Men | |
| RE42,644 E | 8/2011 | Mats | |
| 7,997,832 B2 | 8/2011 | Prichard | |
| 8,007,208 B2 | 8/2011 | Noureddine | |
| 8,021,088 B2 | 9/2011 | Hecht | |
| 8,142,116 B2 | 3/2012 | Frejd | |
| 8,366,358 B2 | 2/2013 | Borschert | |
| 8,376,669 B2 | 2/2013 | Jaeger | |
| 8,430,609 B2 | 4/2013 | Frejd | |
| 8,449,227 B2 | 5/2013 | Danielsson | |
| 8,534,966 B2 | 9/2013 | Hecht | |
| 8,556,552 B2 | 10/2013 | Hecht | |
| 8,596,935 B2 | 12/2013 | Fang et al. | |
| 8,678,722 B2 | 3/2014 | Aare | |
| 8,678,723 B2 | 3/2014 | Osawa | |
| 8,721,235 B2 | 5/2014 | Kretzschmann | |
| 8,784,018 B2 | 7/2014 | Helena | |
| 8,784,019 B2 | 7/2014 | PÄbel | |
| 8,807,888 B2 | 8/2014 | Borschert | |
| 8,882,413 B2 | 11/2014 | Hecht | |
| 8,931,982 B2 | 1/2015 | Osawa | |
| 8,992,142 B2 | 3/2015 | Hecht | |
| 9,028,180 B2 | 5/2015 | Hecht | |
| 9,050,659 B2 * | 6/2015 | Schwaegerl | B23B 51/02 |
| 9,073,128 B2 | 7/2015 | Mack | |
| 9,079,255 B2 | 7/2015 | Zeug | |
| 9,162,295 B2 | 10/2015 | PÄbel | |
| 9,180,650 B2 | 11/2015 | Fang | |
| 9,205,498 B2 | 12/2015 | Jaeger | |
| 9,248,512 B2 | 2/2016 | Aare | |
| 9,296,049 B2 | 3/2016 | Schwaegerl | |
| 9,302,332 B2 | 4/2016 | Scanlon | |
| 9,371,701 B2 | 6/2016 | Cox | |
| 9,481,040 B2 | 11/2016 | Schwaegerl | |
| 9,498,829 B2 | 11/2016 | Zabrosky | |
| D798,921 S | 10/2017 | Frota De Souza Filho | |
| D798,922 S | 10/2017 | Frota De Souza Filho | |
| 2001/0033780 A1 | 10/2001 | Berglund | |
| 2002/0159851 A1 | 10/2002 | Krenzer | |
| 2002/0168239 A1 | 11/2002 | Mast | |
| 2002/0195279 A1 | 12/2002 | Bise | |
| 2003/0039523 A1 | 2/2003 | Kemmer | |
| 2003/0091402 A1 | 5/2003 | Lindblom | |
| 2004/0240949 A1 | 12/2004 | Pachao-Morbitzer | |
| 2005/0084352 A1 | 4/2005 | Borschert | |
| 2005/0135888 A1 | 6/2005 | Stokey | |
| 2006/0072976 A1 | 4/2006 | Frota de Souza | |
| 2006/0093449 A1 | 5/2006 | Hecht | |
| 2008/0003072 A1 | 1/2008 | Kim | |
| 2008/0175676 A1 | 7/2008 | Prichard | |
| 2008/0175677 A1 | 7/2008 | Prichard | |
| 2008/0181741 A1 | 7/2008 | Borschert | |
| 2008/0193231 A1 | 8/2008 | Jonsson | |
| 2008/0193237 A1 | 8/2008 | Men | |

(56) References Cited

U.S. PATENT DOCUMENTS

| | | |
|---|---|---|
| 2009/0044986 A1 | 2/2009 | Jaeger |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311060 A1* | 12/2009 | Frejd .................. B23B 51/02 408/200 |
| 2010/0021253 A1* | 1/2010 | Frejd .................. B23B 51/02 408/200 |
| 2010/0092259 A1 | 4/2010 | Borschert |
| 2010/0143059 A1 | 6/2010 | Hecht |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0307837 A1 | 12/2010 | King et al. |
| 2010/0322723 A1* | 12/2010 | Danielsson .......... B23B 51/02 407/114 |
| 2010/0322728 A1 | 12/2010 | Aare |
| 2010/0322729 A1 | 12/2010 | Päbel |
| 2010/0322731 A1 | 12/2010 | Aare |
| 2011/0020072 A1 | 1/2011 | Chen |
| 2011/0020073 A1 | 1/2011 | Chen |
| 2011/0020077 A1 | 1/2011 | Fouquer |
| 2011/0027021 A1 | 2/2011 | Nelson |
| 2011/0081212 A1 | 4/2011 | Spichtinger |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0168453 A1 | 7/2011 | Kersten et al. |
| 2011/0229277 A1 | 9/2011 | Hoffer |
| 2011/0236145 A1* | 9/2011 | Pabel .................. B23B 51/02 408/226 |
| 2011/0299944 A1 | 12/2011 | Volker Hoefermann |
| 2011/0318128 A1* | 12/2011 | Schwagerl .......... B23B 51/02 408/200 |
| 2012/0003056 A1* | 1/2012 | Jaeger ................. B23B 51/02 408/200 |
| 2012/0014760 A1 | 1/2012 | Glimpel et al. |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1* | 4/2012 | Osawa ................ B23B 51/02 408/200 |
| 2012/0121347 A1 | 5/2012 | Osawa |
| 2012/0308319 A1 | 12/2012 | Sampath |
| 2012/0315101 A1 | 12/2012 | Osawa |
| 2013/0183107 A1 | 7/2013 | Fang |
| 2013/0183112 A1 | 7/2013 | Schwagerl |
| 2013/0209189 A1 | 8/2013 | Borschert |
| 2013/0223943 A1 | 8/2013 | Gey |
| 2013/0259590 A1 | 10/2013 | Shaheen |
| 2013/0266389 A1 | 10/2013 | Hecht |
| 2014/0023449 A1 | 1/2014 | Jonsson |
| 2014/0255115 A1 | 9/2014 | Zabrosky |
| 2014/0255116 A1 | 9/2014 | Myers |
| 2014/0301799 A1 | 10/2014 | Schwaegerl |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 | 4/2015 | Guter |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 | 10/2016 | Peng |

FOREIGN PATENT DOCUMENTS

| | | |
|---|---|---|
| CN | 1204976 A | 1/1999 |
| CN | 1258240 A | 6/2000 |
| CN | 2438535 Y | 11/2001 |
| CN | 1616170 A | 5/2005 |
| CN | 1689740 A | 11/2005 |
| CN | 101048251 A | 10/2007 |
| CN | 100455390 C | 1/2009 |
| CN | 101605622 A | 12/2009 |
| CN | 101610866 A | 12/2009 |
| CN | 102006958 A | 4/2011 |
| CN | 102307693 A | 1/2012 |
| CN | 102310214 A | 1/2012 |
| CN | 104588739 A | 5/2015 |
| CN | 104759664 A | 7/2015 |
| CN | 204545517 U | 8/2015 |
| CN | 204565232 U | 8/2015 |
| CN | 106825693 A | 6/2017 |
| DE | 94340 | 10/1897 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 U1 | 8/1998 |
| DE | 19945097 | 3/2001 |
| DE | 20204848 | 6/2002 |
| DE | 102004022747 A1 | 11/2005 |
| DE | 112009002001 T5 | 2/2013 |
| DE | 102012200690 A1 | 7/2013 |
| DE | 102012212146 | 1/2014 |
| DE | 102013205889 | 5/2014 |
| EP | 118806 | 9/1984 |
| EP | 0599393 B1 | 2/1996 |
| EP | 1136161 | 9/2001 |
| EP | 813459 | 7/2003 |
| EP | 1996358 | 11/2011 |
| EP | 2524755 | 11/2012 |
| FR | 907980 | 3/1946 |
| GB | 17961 | 12/1915 |
| GB | 1395855 | 5/1975 |
| JP | 5537209 | 3/1980 |
| JP | 11019812 A | 1/1999 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005169542 | 6/2005 |
| JP | 2006167871 A | 6/2006 |
| JP | 2008500195 A | 1/2008 |
| JP | 2011036977 A | 2/2011 |
| JP | 6211769 | 9/2017 |
| WO | 8403241 | 8/1984 |
| WO | WO9627469 | 9/1996 |
| WO | 9853943 | 12/1998 |
| WO | WO03031104 A1 | 4/2003 |
| WO | WO2003031104 A1 | 4/2003 |
| WO | WO2007107294 A1 | 9/2007 |
| WO | WO2008072840 A2 | 6/2008 |
| WO | WO2009128775 A1 | 10/2009 |
| WO | WO2010102793 A1 | 9/2010 |
| WO | WO2015064904 A1 | 5/2015 |

OTHER PUBLICATIONS

Mar. 21, 2017 Office action (3 months) 1.
Sep. 2, 2115 First office action 13500285.
Jul. 7, 2015 Office action (3 months) 1.
Jul. 16, 2015—PCT Search Report.
Oct. 22, 2015 Office action (3 months) 1 US 2014-0301799 A1.
Nov. 3, 2015 Final Office Action.

(56) References Cited

OTHER PUBLICATIONS

Nov. 6, 2015 Final Office Action.
Oct. 12, 2015 First office action IL 231436.
Dec. 8, 2015 Office action (3 months) 1.
Feb. 23, 2016 Office action (3 months) 2.
May 13, 2014—Office Action.
Mar. 7, 2016 Final Office Action.
Mar. 23, 2016—First Office Action.
Oct. 25, 2016—Non Final Rejection.
Apr. 12, 2016—Second Office Action.
Jul. 29, 2016 Office action (3 months) 2.
Jul. 30, 2016—Office Action.
Oct. 20, 2016 Office action (3 months) 1.
Nov. 15, 2016—EPO Notification.
Nov. 23, 2016 Final Office Action 2.
Nov. 15, 2016—Second Office Action.
Mar. 22, 2017 First office action.
Apr. 1, 2017 First office action.
Apr. 6, 2017 First office action.
Apr. 6, 2017 Second Office Action.
Apr. 19, 2017 First office action.
May 9, 2017—Second Office Action.
May 25, 2017 Office action (3 months) 3.
Jul. 14, 2017 Office action (3 months) 1.
Sep. 6, 2017 Final Office Action.
Sep. 19, 2017 Final Office Action.

* cited by examiner

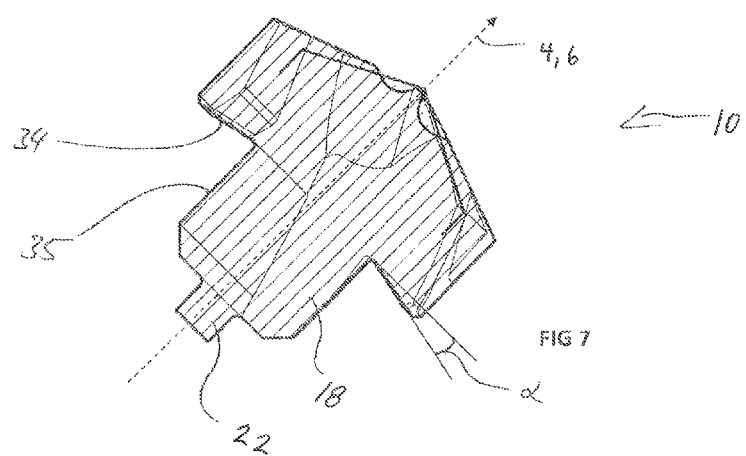
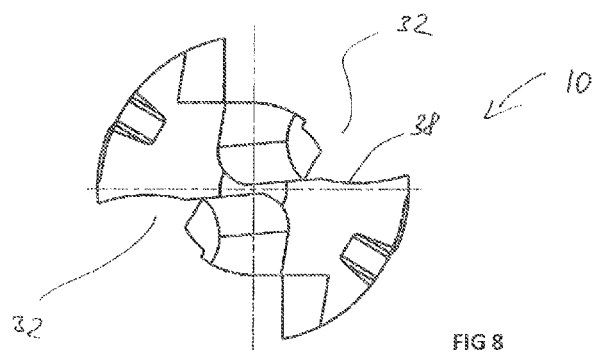

MODULAR CARRIER TOOL AND TOOL HEAD

RELATED APPLICATION DATA

The present application claims priority under 35 U.S.C. § 119(a) to German Patent Application Number 102013220884.7, filed Oct. 15, 2013 which is incorporated herein by reference in its entirety.

FIELD

The invention relates to a modular carrier tool, especially a drilling tool, with the characteristics of the preamble of claim 1 as well as a tool head for a carrier tool of this type with the characteristics of the preamble of claim 10.

BACKGROUND

A prior carrier tool having an exchangeable tool head is described in EP 1 476 269 B1. The modular carrier tool described therein comprises a carrier in which a tool head is inserted on the front-end in a reversible exchangeable manner. The tool head is accepted exclusively in a clamping manner by a head retainer. For this purpose, the head retainer comprises two clamping webs that are formed separately from each other on the front-end of the carrier and extend in an axial direction, which clamp the tool head in between themselves. During assembly, the tool head is first inserted in an axial direction and then rotated against the cutting direction, whereby the clamping surfaces are brought into contact with each other. In addition to clamping in a radial direction, a pull-out protection acting in an axial direction is also accomplished. During assembly, the tool head is pressed against the clamping webs in an axial direction. For this purpose, the tool head has plane underhead bearing surfaces running perpendicularly to a central longitudinal axis, with which the tool head supports itself on corresponding bearing surfaces on the clamping webs.

For this particular type of modular carrier tool, no further fastening elements, such as, for example, fastening screws are provided. The tool head is exchanged and replaced by a new one as soon as it is worn out. Therefore, a multitude of tool heads are inserted into the carrier throughout its lifetime. It is possible that throughout the course of the service life the elasticity of the freely protruding clamping webs decreases and with that the clamping force exerted unto the tool head weakens, so that as the service life of the carrier progresses, the tool head is no longer held in an adequately fail-safe manner.

SUMMARY

On this basis, the object of the present invention is to provide improved seating of the tool head in the head retainer in a modular carrier tool of this type and in particular to achieve improved service life with adequately high clamping power.

This object is accomplished according to the present invention by means of a modular carrier tool with the characteristics of claim 1 as well as by means of a tool head with the characteristics of claim 9. The advantages of the preferred embodiments in respect to the carrier tool as listed below are analogously applicable to the tool head.

The modular carrier tool is in particular a drilling tool, which extends along a central longitudinal axis in axial direction and comprises a carrier as well as a tool head that can be reversibly mounted on the front-end of the carrier. The carrier has a head retainer for the insertion of the tool head as well as clamping webs, which radially delimit the head retainer. The tool head has clamping surfaces extending in an axial direction as well as underhead bearing surfaces. In a mounted state, the clamping webs clamp the tool head in radial direction to the clamping surfaces and the underhead bearing surfaces are pressed against the bearing surfaces. In order to now ensure improved seating of the tool head in the head retainer, the underhead bearing surfaces as well as the bearing surfaces are tilted by a tilt angle α in radial direction relative to the central longitudinal axis, so that a force component is exerted in radial direction onto the clamping webs in a mounted state.

Due to this additional radial force component unto the clamping webs, an initial automatic centering of the two components occurs in an advantageous manner, namely the tool head and the carrier to one another, so that they are exactly axially parallel aligned. Furthermore, a suitable configuration of the tilting of the underhead bearing surfaces as well as of the bearing surfaces supports the clamping force exerted through the elasticity of the clamping webs, so that an improved seating of the tool head in the head retainer is achieved.

The bearing surfaces and the underhead bearing surfaces—as seen in a sectional view—are therefore approximately radially tilted roof-like in an outwardly sloping manner. As a result, when pressed against each other a force component is generated that is oriented onto the clamping webs in the direction towards the central longitudinal axis. The clamping webs are therefore pressed by the force component inwardly towards each other, where they work together with the clamping surfaces of the tool head.

Here, clamping surfaces extending in axial direction are understood to be surfaces or surface sections that essentially extend in axial direction but at the same time can be tilted relative to the exact axial direction by a small degree, for example 0 to 10 degrees. In the same way, the term "in radial direction" is understood as the orientation of a circumference point towards the central longitudinal axis, not however necessarily the perpendicular orientation to the central longitudinal axis.

The tilt angle, at which the underhead bearing surfaces and the bearing surfaces are tilted, expediently is in a range between 0.5 to 10° and particularly in a range between 3 to 7°.

In principle, it is also possible instead of the outwardly sloped design to form the surfaces sloping inwardly, so that instead of a roof-like design an approximately V-like design is achieved. This will also lead to automatic centering of the two components; however, in this case the clamping webs are spread apart, which is usually not desired for the clamping position of the tool head.

The clamping webs are formed in peripheral direction as separate unconnected sections of the carrier, which between them define the head retainer. Due to the breaks in the peripheral direction, the bearing surfaces of an expedient embodiment are therefore formed as conical shell segments, which extend over a certain tilt range in peripheral direction. Complementary to this, the underhead bearing surfaces are generally also formed in peripheral direction as separate unconnected sections of the tool head. They are typically interrupted by flute sections in the tool head. Therefore, these underhead bearing surfaces are also conical shell segments.

According to a preferred embodiment the clamping webs are also formed for the transmission of the torque required during operation from the carrier to the tool head. Therefore, they have surfaces for torque transmission operative in the peripheral or rotational direction, against which the corresponding surfaces for torque transmission of the tool head fit closely. These are typically formed between an open front end face and the bearing surfaces, which are, for this purpose, recessed in axial direction. With their outer circumference, the clamping webs generally define the outer circumference of the carrier tool Due to the recessed design of the surfaces for the creation of the surfaces for torque transmission, the clamping webs have a kind of notch, into which the tool head enters and which extends to the outer circumference of the carrier tool.

Preferably, a fastening pin is adjoined to the underhead bearing surfaces in axial direction for a clamping retention in the head retainer. Thereby, the fastening pin serves particularly as a centering pin, so that the tool head can be axially parallel centered in the carrier as precisely as possible. The clamping surfaces for the radial clamping of the tool head are preferably formed on this fastening pin. Alternatively, they are formed in the area of the surfaces for torque transmission, meaning—seen in an axial direction—in front of the underhead bearing surfaces in the direction towards a drill head.

A preferred embodiment is completed by additionally providing an insertion pin, which adjoins the fastening pin in axial direction. It serves for easy insertion of the tool head into the head retainer. However, there is no clamping or pressing fit formed between the insertion pin and the head retainer in the mounted end-state—unlike with the fastening pin.

Expediently, the carrier further has a cutting area with flutes, which are continued as flute sections in the tool head. Finally, a clamping area of the carrier generally adjoins the cutting area, with which the carrier is inserted into a machine tool. The carrier tool is generally a rotary machining tool, which rotates around a central longitudinal axis. Therefore, the central longitudinal axis defines at the same time the rotation axis.

The tool head is overall expediently formed for a purely clamping fastening in the head retainer, without any further fastening or clamping elements being disposed. For reliable pull-out protection, it is preferred that surface sections are formed on the tool head and correspondingly also on the head retainer, which are oriented slanted relative to the axial direction and thus form a positive-locking fit extending in an axial direction. For this purpose, the fastening pin is, for example, designed slightly conically. As an alternative or in addition, the surfaces for torque transmission are further designed tilted relative to the axial direction, in order to achieve pull-out protection through a positive-locking fit.

BRIEF DESCRIPTION OF THE DRAWINGS

In the following text, an embodiment of the invention will be explained using the figures. These show.

DETAILED DESCRIPTION

Figure 1:
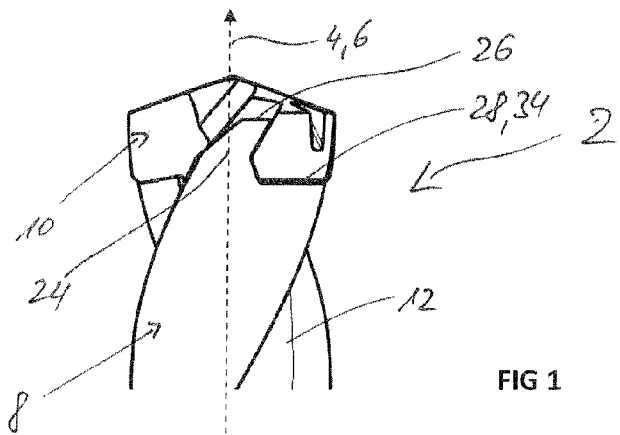
FIG. 1 a partially shown modular carrier tool shown in a side view.

The modular carrier tool 2 shown in FIG. 1 extends along a central longitudinal axis 4 in axial direction 6. The carrier tool 2 is formed by a carrier 8 and a tool head 10, inserted into the carrier 8 in a reversible, exchangeable manner.

Figure 2:
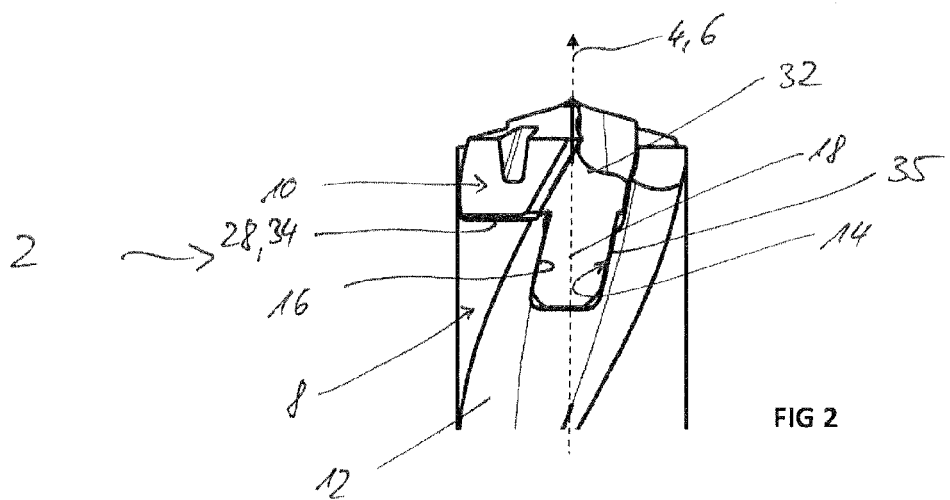
FIG. 2 the carrier tool according to FIG. 1 following a 90° rotation around a central longitudinal axis, FIG. 3 the carrier tool according to FIG. 1 in a sectional view through the central longitudinal axis, FIG. 4 the carrier tool according to FIG. 1 in an exploded view, FIG. 5 a top view onto the carrier tool according to FIG. 1, FIG. 6 a side view of a tool head, as it is inserted into the carrier tool according to FIG. 1, FIG. 7 a sectional view of the tool head according to FIG. 6 through the central longitudinal axis as well as FIG. 8 a top view onto the tool head according to FIG. 6.

The carrier 8 has a rearward clamping area or a clamping shaft (not shown in greater detail here) with which it is clamped into a machine tool during operation. A cutting area is adjoining this, into which flutes 12 for chip clearance are incorporated. At the front end face the carrier 8 has a head retainer 14, into which the tool head 10 is inserted. As indicated especially in the cross-section view according to FIG. 3, the head retainer 14 has a pin receptacle 16 for a fastening pin 18 of the tool head 10, Another receptacle for an insertion pin 22 of the tool head 10 adjoins concentrically and in the direction of the central longitudinal axis 4 to the pin receptacle 16. The pin receptacle 16 is—as shown for example in FIG. 2—cut through the flutes 12, so that it is open towards each of the flutes 12 in a radial direction. The pin receptacle 16 is outwardly delimited by lateral clamping webs 24. The clamping webs 24 extend in axial direction 6 to an open end face 26. In the front area, the clamping webs have a notch, so that on the one hand a bearing surface 28 recessed in an axial direction in relation to the open end face is formed.

Figure 4:
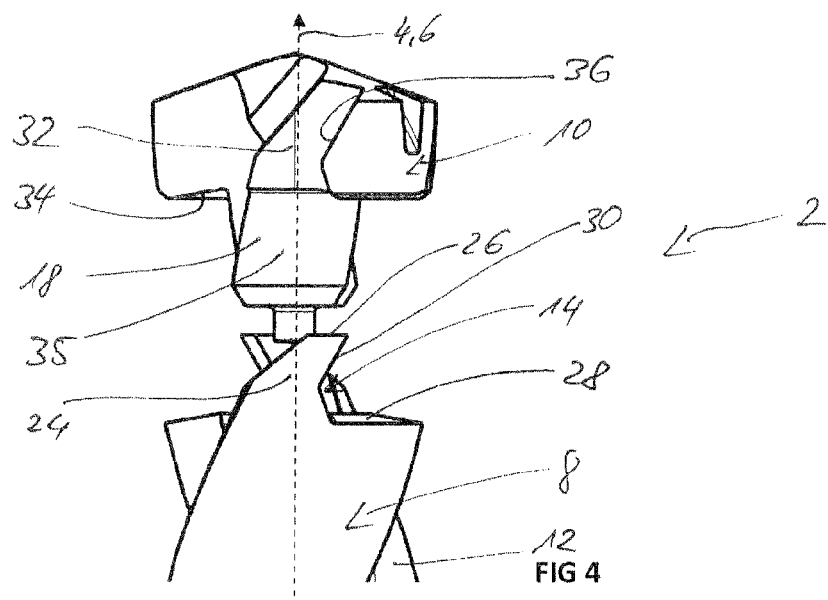
Figure 5:
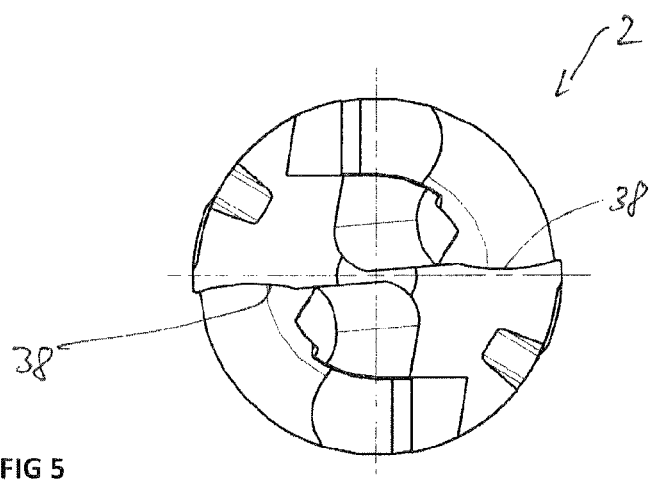
Figure 6:
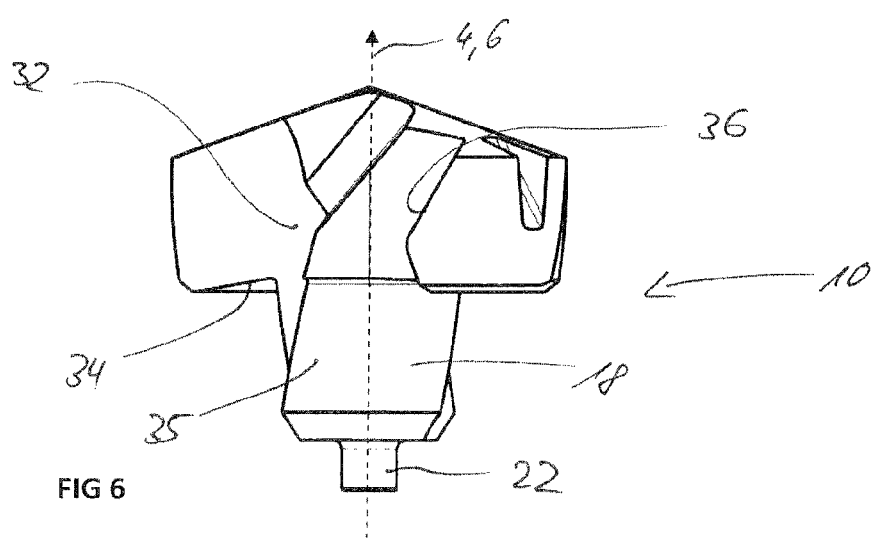

The section extending in axial direction 6 between the bearing surfaces 28 and the end faces 26 is formed as a section for torque transmission, which respectively forms surfaces for torque transmission 30. These are regularly spread out by the radial direction and the direction of extension. The axial direction of extension may be exactly the axial direction 6 or—as shown particularly in FIG. 4 of the embodiment—it may be a direction of extension in an angle relative to the axial direction. The surface for torque transmission 30 has two sections, which are arranged approximately in a V-shape to each other, as can also be seen particularly in this figure. As an alternative, only a surface section is formed, which at the same time is designed for positive locking extending in an axial direction for reliable pull-out protection.

The tool head 10 is designed in correspondence to the design of the carrier 8. It has flute sections 32 that continue the flutes 12 in the tool head. They thereby cut across part of the fastening pin 18. Adjoining the fastening pin 18 in an axial direction 6 towards a forward tool tip is a widened section of the tool head 10, which forms the actual cutting area. At the transition to the fastening pin 18, the cutting area has radially extending underhead bearing surfaces 34, with which the tool head 10 is pressed against the bearing surfaces 28 of the head retainer 14 when in a mounted final state.

In the mounted state, the clamping webs 24 exert a radial clamping force unto the fastening pin 18. The surface area of the fastening pin 18, at least segments thereof, therefore form clamping surfaces 35.

Corresponding to the surfaces for torque transmission 30 of the carrier 8, the tool head 10 also has surfaces for torque transmission 36, which are designed approximately in V-shape in the embodiment in the side view. In a mounted state, they lie flat against the corresponding surfaces for torque transmission 30 of the carrier 8.

The entire tool head 10 is formed approximately like a cone at its tip and has two radially extending main cutting edges 38, which are connected with each other by a chisel edge in the drilling center, so that the result is an approximately S-shaped curve of the cutting edge. In rotational direction, the main cutting edges 38 are each adjoined at the end-face by open surfaces in the form of conical shell segments. Engagement areas for an auxiliary tool are incorporated into these open surfaces, spaced apart from the main cutting edge 38. The auxiliary tool is used for inserting and especially loosening of the tool head 10.

Figure 3:
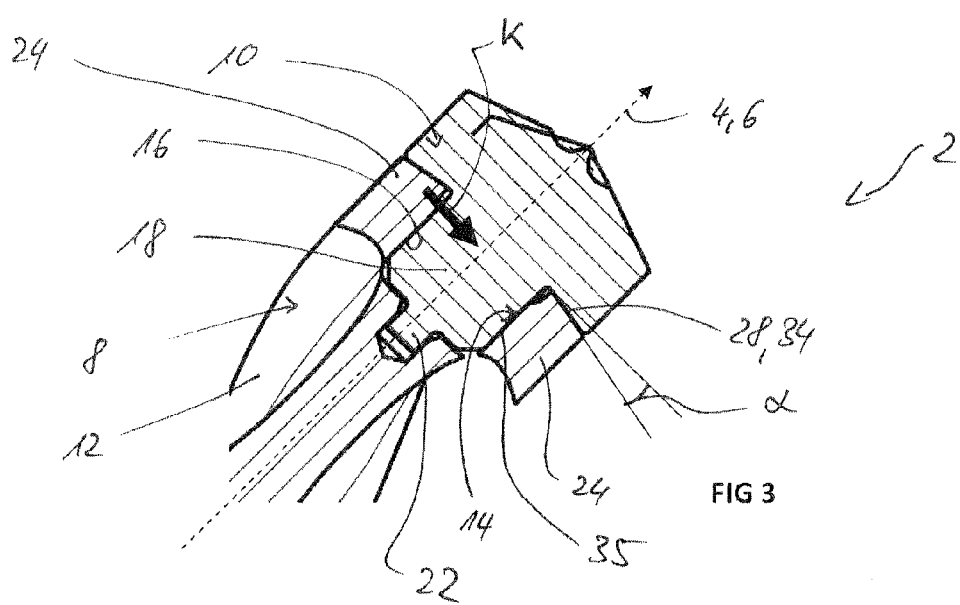

As shown especially in FIGS. 3 and 7, the bearing surfaces 28 as well as the underhead bearing surfaces 34 are disposed tilted at a tilt angle α in direction to the central longitudinal axis 4. The tilt angle α of the embodiment is preferably about 10°. Generally, the tilt angle is preferably in a range between 0.5 and 15° and preferably in a range between 2 and 8°.

The surfaces 28, 34 are tilted at the same tilt angle α, the tilt is hereby relative to the vertical of the central longitudinal axis 4. The surfaces 28, 34 are generally designed as circular ring segment surfaces. According to the tilt relative to the central longitudinal axis 4, they are therefore designed as conical shell segments. In the embodiment they are formed particularly as being tilted outwardly in a sloping manner. By means of this particular design it is accomplished that by inserting the tool head 10, wherein the same is tightened against the carrier 8, a force component K acting in a radial direction is exerted. Thus, the clamping webs 24 are pressed centrally, inwardly in the direction of the central longitudinal axis, whereby the radial clamping force is further increased.

The invention claimed is:

1. A modular carrier tool which extends along a central longitudinal axis in an axial direction and comprises a carrier as well as a tool head that can be reversibly mounted on a front-end of the carrier, wherein:
the carrier comprises:
a head retainer for the insertion of the tool head; and
clamping webs which define radially outermost portions of the head retainer and include bearing surfaces extending along a radial direction; and
the tool head comprises:
clamping surfaces extending in an axial direction;
underhead bearing surfaces;
flute sections; and
torque transmission surfaces which:
extend radially to an outer periphery of the tool head; and
extend axially from the underhead bearing surfaces toward a front of the tool head;
wherein, along a peripheral direction of the tool head, each of the underhead bearing surfaces extends between one of the torque transmission surfaces and one of the flute sections;
wherein, in a mounted state:
the clamping webs clamp the tool head to the clamping surfaces in a radial direction with respect to the central longitudinal axis; and
the underhead bearing surfaces are pressed against the bearing surfaces of the carrier;
wherein the bearing surfaces of the carrier and the underhead bearing surfaces are tilted at a tilt angle defined along a radial direction with respect to the central longitudinal axis, such that in the mounted state a force component is exerted on the clamping webs in a radial direction with respect to the central longitudinal axis.

2. The carrier tool according to claim 1, wherein:
the bearing surfaces of the carrier and the underhead bearing surfaces are tilted radially outwardly, such that the exerted force component is oriented in a radial direction towards the central longitudinal axis.

3. The carrier tool according to claim 1, wherein the tilt angle is in the range of 0.5 to 10°.

4. The carrier tool according to claim 1, wherein the underhead bearing surfaces and the bearing surfaces of the carrier are conical shell segments.

5. The carrier tool according to claim 1, wherein:
the clamping webs each have an open front end face;
each open front end face, in the mounted state, is not covered by the tool head;
the bearing surfaces of the carrier are recessed, in an axial direction, relative to the open front end faces; and
surfaces for torque transmission are formed between the end faces and the bearing surfaces of the carrier.

6. The carrier tool according to claim 1, wherein, for clamping retention in the head retainer, a fastening pin is adjoined to the underhead bearing surfaces in an axial direction.

7. The carrier tool according to claim 1, wherein:
the carrier has flutes; and
the flutes are extended into the tool head as the flute sections.

8. The carrier tool according to claim 1, wherein the tool head is configured to be fastened in the head retainer solely via clamping.

9. The carrier tool according to claim 1, wherein the carrier tool is a drilling tool.

10. A tool head for reversible fastening in a carrier for a carrier tool, the tool head extending in an axial direction along a central longitudinal axis, the tool head comprising:
clamping surfaces extending in an axial direction;
underhead bearing surfaces extending in an axial direction, via which the tool head sits on bearing surfaces of the carrier in a mounted state;
flute sections; and
torque transmission surfaces which:
extend radially to an outer periphery of the tool head; and
extend axially from the underhead bearing surfaces toward a front of the tool head;
wherein, along a peripheral direction of the tool head, each of the underhead bearing surfaces extends between one of the torque transmission surfaces and one of the flute sections;
wherein the underhead bearing surfaces are tilted at a tilt angle defined along a radial direction with respect to the central longitudinal axis.

11. The tool head according to claim 10, wherein:
the underhead bearing surfaces are radially tilted in an outwardly sloped manner.

12. The tool head according to claim 9, wherein the tilt angle is in the range of 0.5 to 10°.

13. The carrier tool according to claim 6, comprising:
an insertion pin which extends axially away from the fastening pin, wherein the insertion pin and fastening pin are concentric with respect to one another;
the insertion pin defining a smaller outer diameter than the fastening pin;
the carrier including a receptacle for the fastening pin and a receptacle for the insertion pin;

the receptacle for the fastening pin and the receptacle for the insertion pin being concentric with respect to one another.

14. A modular carrier tool comprising:
a carrier for accommodating a tool head, the carrier comprising bearing surfaces extending along a radial direction with respect to a central longitudinal axis of the modular carrier tool; and
a tool head comprising:
  underhead bearing surfaces which engage with the bearing surfaces of the carrier, when the tool head is accommodated in the carrier;
  flute sections; and
  torque transmission surfaces which:
    extend radially to an outer periphery of the tool head; and
    extend axially from the underhead bearing surfaces toward a front of the tool head;
  wherein, along a peripheral direction of the tool head, each of the underhead bearing surfaces extends between one of the torque transmission surfaces and one of the flute sections;
wherein the bearing surfaces of the carrier and the underhead bearing surfaces are tilted at a tilt angle defined along a radial direction with respect to the central longitudinal axis.

15. The modular carrier tool according to claim 13, wherein the tool head is configured to be reversibly mounted at a front-end of the carrier.

* * * * *